(12) United States Patent
Gerovac

(10) Patent No.: US 10,192,667 B2
(45) Date of Patent: Jan. 29, 2019

(54) ENCLOSURE SYSTEM AND METHOD FOR FACILITATING INSTALLATION OF ELECTRICAL EQUIPMENT

(71) Applicant: Hubbell Incorporated, Shelton, CT (US)

(72) Inventor: Joseph P. Gerovac, Menomonee Falls, WI (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/543,796

(22) Filed: Nov. 17, 2014

(65) Prior Publication Data

US 2015/0206644 A1    Jul. 23, 2015

Related U.S. Application Data

(63) Continuation of application No. 13/037,044, filed on Feb. 28, 2011, now Pat. No. 8,891,228.

(51) Int. Cl.

| | |
|---|---|
| *H01F 27/00* | (2006.01) |
| *H01F 27/02* | (2006.01) |
| *H02B 1/50* | (2006.01) |
| *H01F 27/06* | (2006.01) |
| *H01F 41/00* | (2006.01) |
| *H02B 1/16* | (2006.01) |
| *H02B 1/30* | (2006.01) |
| *H02B 1/32* | (2006.01) |

(52) U.S. Cl.
CPC ............. *H01F 27/02* (2013.01); *H01F 27/06* (2013.01); *H01F 41/00* (2013.01); *H02B 1/16* (2013.01); *H02B 1/301* (2013.01); *H02B 1/32* (2013.01); *H02B 1/50* (2013.01); *Y10T 29/4902* (2015.01); *Y10T 29/49002* (2015.01)

(58) Field of Classification Search
CPC .......... H01F 27/02; H01F 27/06; H01F 41/00; H02B 1/16; H02B 1/30; H02B 1/301; H02B 1/32; Y10T 29/4902
USPC ............ 361/836, 600–626; 336/65; 312/294, 312/306, 312, 223.2, 223.6; 211/134; 248/250
See application file for complete search history.

(56) References Cited

U.S. PATENT DOCUMENTS

| | | | | | |
|---|---|---|---|---|---|
| 2,780,510 | A | * | 2/1957 | Cole, Jr. ................ | A47B 88/10 312/334.13 |
| 3,742,410 | A | * | 6/1973 | Smith ...................... | H01F 5/04 336/174 |
| 3,896,353 | A | * | 7/1975 | Burton ................. | H02B 11/133 200/50.26 |
| 4,073,000 | A | * | 2/1978 | Krejsa .................... | H02B 13/02 200/50.09 |
| 5,046,861 | A | * | 9/1991 | Tarver ................ | A47B 88/0485 312/330.1 |

(Continued)

*Primary Examiner* — Dimary Lopez Cruz
*Assistant Examiner* — Zhengfu Feng
(74) *Attorney, Agent, or Firm* — Michael Best & Friedrich, LLP

(57) ABSTRACT

An enclosure for electrical equipment is provided. The enclosure includes a frame, a first plate, and a first member coupled to the frame and configured to receive the first plate. The first plate is configured to receive a transformer, movable between a first position and a second position, at least partially supported by the first member when the first plate is in the first position, and offset from the first member when the first plate is in the second position.

11 Claims, 9 Drawing Sheets

(56) References Cited

U.S. PATENT DOCUMENTS

| | | | | |
|---|---|---|---|---|
| 5,575,667 A | * | 11/1996 | Mehez | H01R 9/032 439/579 |
| 6,921,467 B2 | * | 7/2005 | Hanson | C23C 18/1632 204/212 |
| 2009/0267466 A1 | * | 10/2009 | Zook | E05C 9/043 312/223.6 |

* cited by examiner

Enclosure System and Method for Facilitating Installation of Electrical Equipment

BACKGROUND OF THE INVENTION

The present disclosure relates generally to the field of enclosures for an electrical system. More specifically, the present disclosure relates to the field of enclosures suitable for metering and instrumentation transformers for power distribution.

Enclosures are structures which separate contents from the surrounding environment. Some enclosures contain electrical or electronic equipment. These enclosures may provide for mounting of the electrical or electronic equipment for preventing electrical shock to equipment users, and for protecting the equipment from the environment.

One application for electrical enclosures is to house transformers for metering and instrumentation applications. In such an application, the enclosure may be located in an industrial or commercial environment or residential neighborhood and receive "line" electrical cables from a utility power company. The enclosure may also receive "load" electrical cables from the utility or electricity consumers (e.g., stores, factories, or houses).

One continuing challenge in the field of metering transformer enclosures is in installation and replacement of transformers. Utility metering transformers may weigh eighty pounds. When installing or removing hanging transformers, lifting equipment may be required to support the transformers weight. Inserting lifting equipment into an enclosure can increase the risk of accidents. Therefore, there is a need for an enclosure that will support heavy electrical equipment, such as a transformer, daring installation and removal. There is also a need for an enclosure that facilitates installation and removal of heavy electrical equipment without the use of lifting equipment.

SUMMARY OF THE INVENTION

One embodiment of the disclosure relates to an enclosure for electrical equipment including a frame, a first plate, and a first member coupled to the frame and configured to receive the first plate. The first plate is configured to receive a transformer, the first plate is movable between a first position and a second position, the first plate is at least partially supported by the first member when the first plate is in the first position, and the first plate is offset from the first member when the first plate is in the second position.

Another embodiment relates to an enclosure for electrical equipment including a first transformer supported by a first plate. The enclosure comprises a frame and a first member. The first member is coupled to the frame and configured to receive the first plate, the first plate is at least partially supported by the first member when the first plate is in a first position, and the first plate is offset from the first member when the first plate is in a second position.

Another embodiment relates to a method for installing a transformer into an enclosure for electrical equipment. The method includes providing an enclosure for electrical equipment, coupling a first member to the frame; coupling a transformer to a first plate, placing the first plate into the enclosure such that it is at least partially supported by the first member, and fastening the first plate to the frame. The enclosure includes a frame.

DETAILED DESCRIPTION OF THE PREFERRED EMBODIMENTS

Referring to the FIGURES, an enclosure for electrical equipment and components thereof are shown according to exemplary embodiments. The enclosure generally includes a frame, a first plate, and a first member. The first member is coupled to the frame and configured to receive the first plate. The first plate may be configured to receive a transformer and may be movable between a first position and a second position. The first plate is at least partially supported by the first member when the first plate is in the first position. The first plate is offset from the first member when the first plate is in the second position.

According to an exemplary embodiment, the enclosure is used in electrical applications, such as, for metering of electric power. As such, the enclosure may be located in an industrial or commercial environment or residential neighborhood and receive electrical cables from a utility company. In this application, the enclosure may receive and provide significant electric power, such as power at thousands of Volts and hundreds of Amperes. According to one embodiment, the enclosure includes a current transformer and a voltage transformer.

The enclosure may have any number of compartments. The exemplary embodiments shown include two compartments: a front compartment (e.g., elbow compartment, dead compartment) that encloses electrical connections for power entry and exit cables, and a rear compartment (e.g., metering compartment, live compartment) that encloses the transformers. The embodiments shown are configured to be mounted on a concrete pad; however, alternate embodiments may be pole mounted or located in a vault.

Before discussing further details of the enclosure, it should be noted that references to "front," "back," "rear" "upper," "lower," "right," and "left" in this description are merely used to identify the various elements as they are oriented in the FIGURES, with "front," "back," and "rear" being relative to a specific direction. These terms are not meant to limit the element which they describe, as the various elements may be oriented differently in various applications.

It should further be noted that, for purposes of this disclosure, the term coupled means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
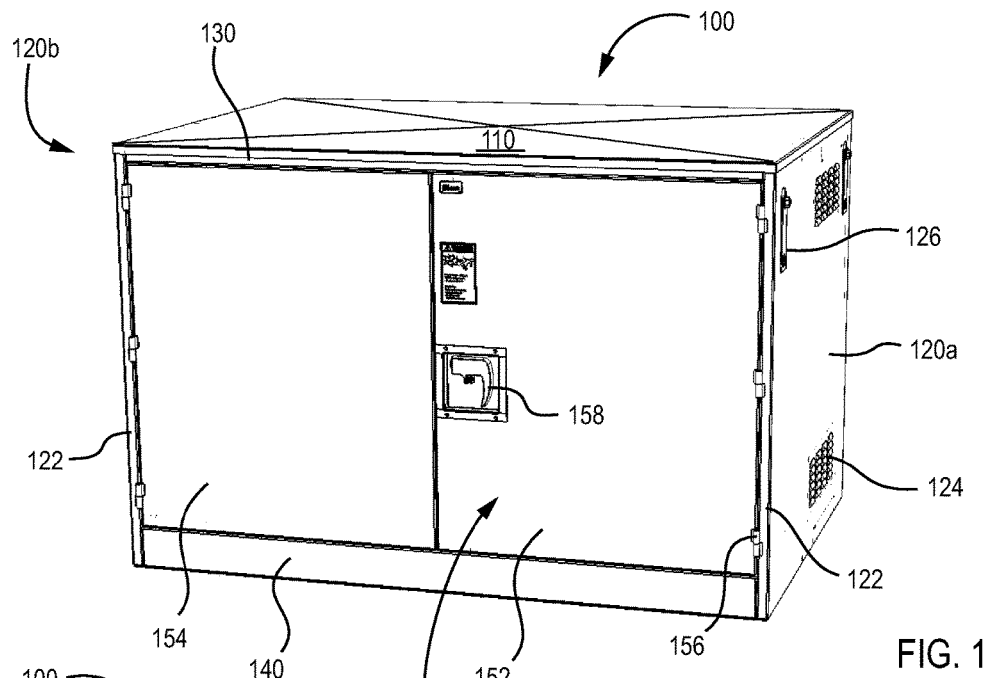
FIG. 1 is a perspective view schematic drawing of an enclosure with its doors closed, shown according to an exemplary embodiment.

Referring to FIG. 1, a perspective view of an enclosure 100 is shown according to an exemplary embodiment. The front side (e.g., elbow side, dead side) of enclosure 100 is shown from an upper-right perspective. Enclosure 100 may be of any shape. According to various embodiments, enclosure 100 may have round, triangular, hexagonal, octagonal, or polygonal footprints or my have cylindrical or regular or irregular polyhedron shapes. According to the embodiment shown, enclosure 100 is substantially box-shaped (e.g., rectangular, prism shaped, etc.). The exterior of enclosure 100 may be made of any suitably rigid and durable material (e.g., mild steel, stainless steel, or aluminum sheets). According to an exemplary embodiment, the exterior of enclosure 100 is constructed of 12 gauge mild steel. Enclosure 100 includes exterior panels which can be bent or stamped to shape. According to an exemplary embodiment, exterior panels are all welded, thereby increasing ground paths.

According to the embodiment shown in FIG. 1, enclosure 100 includes a roof 110, sidewalls 120, upper beam 130, lower beam 140, and aperture 150, which is coved by right front door 152 and left front door 154. Roof 110 may have a variety of shapes (e.g., flat, peaked, ridged, domed, etc.). According to the exemplary embodiment shown, roof 110 is cross-kinked, which provides rigidity and facilitates water run-off.

Enclosure 100 is further shown to include exterior sidewalls 120. First sidewall 120a can be located on the right side of enclosure 100, and second sidewall 120b can be located opposite side-wall 120a on the left side of enclosure 100. Sidewalls 120 may include flanges 122, located on a front side of enclosure 100. Flanges 122 may be coupled to sidewalls 120 or, as shown, bent from an end portion of sidewall 120. Sidewalls 120 may include louvers 124 to facilitate ventilation of the rear compartment of enclosure 100. Sidewalls 120 may include lifting lugs 126. Lifting lugs 126 may be permanently coupled to enclosure 100, or as shown, removably fastened to sidewall 120.

Enclosure 100 may include an upper beam 130 and a lower beam 140. Upper beam 130, lower beam 140, and sidewall flanges 122 define an aperture 150. Enclosure 100 may include at least one door to cover aperture 150. Enclosure 100 can include a right front door 152 and a left front door 154. Front doors 152 and 154 are shown to be rotatably coupled to sidewall flanges 122 with hinges 156. Doors 152 and/or 154 may include a handle. Door 152 includes handle 158. Handle 158 may fold into a recess in door 152 such that a surface of handle 158 is flush with an exterior surface of door 152.

Figure 2:
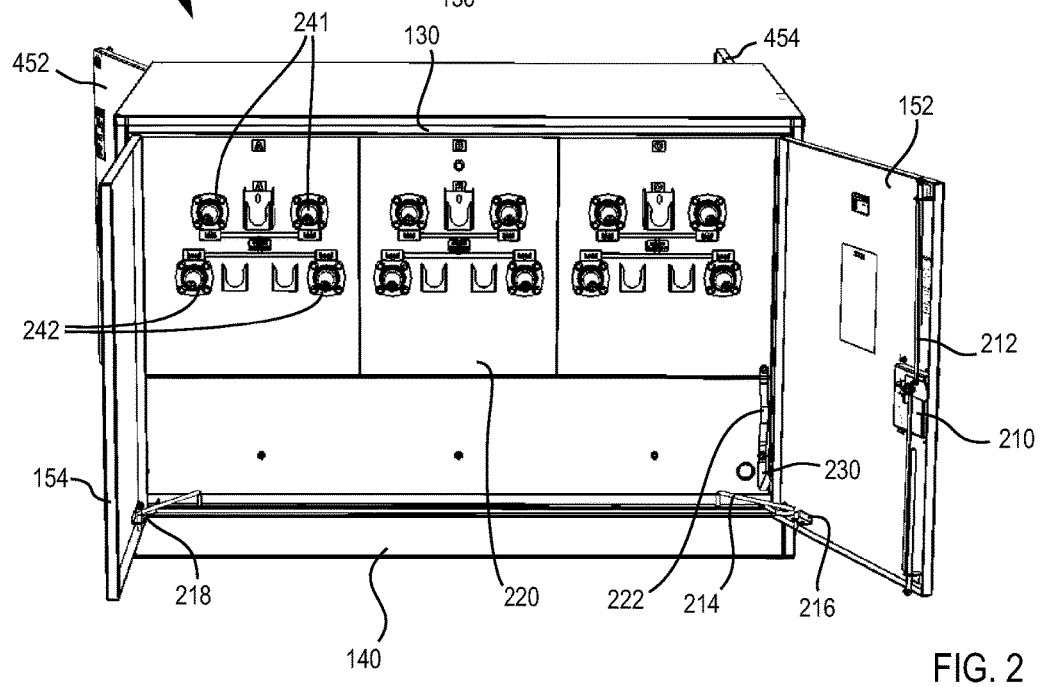
FIG. 2 is a front planar view schematic drawing of the enclosure of FIG. 1 with its doors open, shown according to an exemplary embodiment.

Referring to FIG. 2, a front view of enclosure 100 is shown according to an exemplary embodiment. Front doors 152 and 154 may be opened to provide access to the front compartment. Door 152 is shown to include a locking mechanism 210. Locking mechanism 210 may include rods 212 which extend into upper beam 130 and lower beam 140 to secure door 152 closed. Locking mechanism 210 is connected to handle 158 through door 152. Rotation of handle 158 may actuate rods 212 to allow opening or securing of door 152. Doors 152 and 154 may include prop mechanisms, for example prop 214, to hold the door in a predetermined position. A first end of prop 214 engages a hole in lower beam 140. A second end of prop 214 engages a hole in a door flange 216, which may coupled a bottom portion of door 152. Door flange 216 is shown to include two holes which may be used to selectively lock door the door at a 90 degrees open or a 120 degrees open, a shown with door 154 and door 152, respectively. Doors 152 and 154 may include ground straps 218. Ground straps 218 electrically couple the doors to a grounding point, which is electrically grounded.

According to the exemplary embodiment shown, enclosure 100 includes a wall 220 (e.g., dividing wall, dead wall), which separates the front and rear compartments of enclosure 100. Wall 220 may comprise one or more segments. According to the embodiment shown, wall 220 comprises a top segment and a bottom segment. Wall 220 may be electrically grounded. Ground strap 222 electrically couples the top and bottom segments of wall 220 to a grounding point 230, which is electrically grounded. Wall 220 may support one or more bushings which pass through wall 220 from the rear compartment to the front compartment. According to the embodiment shown, bushings 241 connect to the line side of a transformer in the rear compartment, and bushings 242 connect to the load side of a transformer in the rear compartment.

Figure 3:
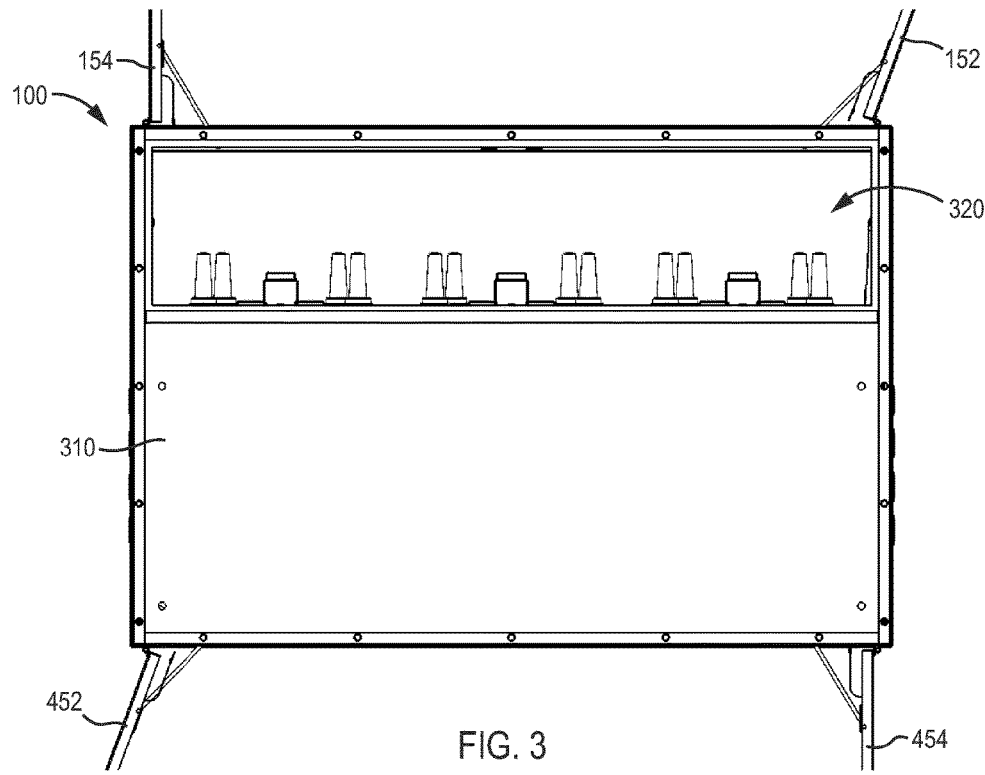
FIG. 3 is a bottom planar view schematic drawing of the enclosure of FIG. 1 with its doors open, shown according to an exemplary embodiment.

Referring to FIG. 3, a bottom view of enclosure 100 is shown according to an exemplary embodiment. Enclosure 100 may or may not include a bottom 310. Bottom 310 may or may not completely cover the bottom side of enclosure 100. Bottom 310 is shown to define a hole 320. Enclosure 100 may receive cables (e.g., utility company's power cables) through hole 320. According to the embodiment shown, bottom 310 at least partially encloses the rear compartment. As such, bottom 310 may at least partially support equipment (e.g., a transformer) in the rear compartment.

Figure 4:
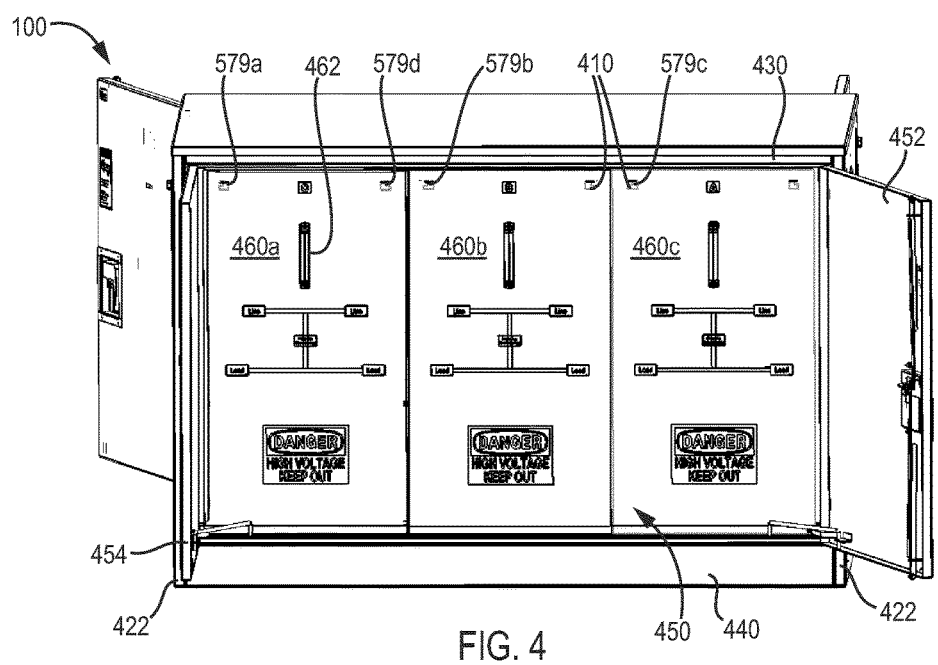
FIG. 4 is a rear planar view schematic drawing of the enclosure of FIG. 1 with its doors open, shown according to an exemplary embodiment.

Referring to FIG. 4, a rear elevation view of enclosure 100 is shown according to an exemplary embodiment. The rear exterior of enclosure 100 may or may not be similar to the front exterior. According to the embodiment shown, side flanges 422, upper beam 430, lower beam 440, right door 452 and left door 454 are structurally similar to the corresponding components on the front of enclosure 100. Side flanges 422, upper beam 430, and lower beam are shown to define an aperture 450. When closed, doors 452 and 454 fill aperture 450. Doors 452 and 454 may include locking mechanisms, prop mechanisms, and grounding straps similar to those described for doors 152 and 154.

Enclosure 100 may include at least one barrier 460. Barrier 460 is made from an electrically insulating material (e.g., plastic, fiberglass reinforced laminate, etc.). Locating barrier 460 between electrical equipment in the rear compartment and doors 452 and 454 reduces the possibility of arcing between the equipment and doors. As such, barrier 460 is offset from doors 452 and 454. According to one embodiment, barrier 460 is offset less than three inches from door 452 or 454. According to another embodiment, barrier 460 is spaced apart from a plane defined by an exterior of the enclosure 100 surrounding the aperture 450. According to the exemplary embodiment shown, barrier 460 is offset between one and two inches from door 452 or 454. To facilitate removal, barrier 460 may include at least one handle 462. Handle 462 is shown to be relatively large such that it may be grasped with gloves or used with a hotstick.

Enclosure 100 may include more than one barrier 460. In such a configuration, a first barrier may be removed to access electrical equipment behind the first barrier while leaving second barrier in place to protect a user from energized equipment behind the second barrier. According to the embodiment shown, enclosure 100 includes a first barrier 460a, a second barrier 460b, and a third barrier 460c. As such, in a three-phase electrical system, a user may remove one barrier to access a first phase transformer, while leaving the other barriers in place to provide protection from the second and third phase transformers. Alternatively, a user may remove any number of barriers.

Figure 5:
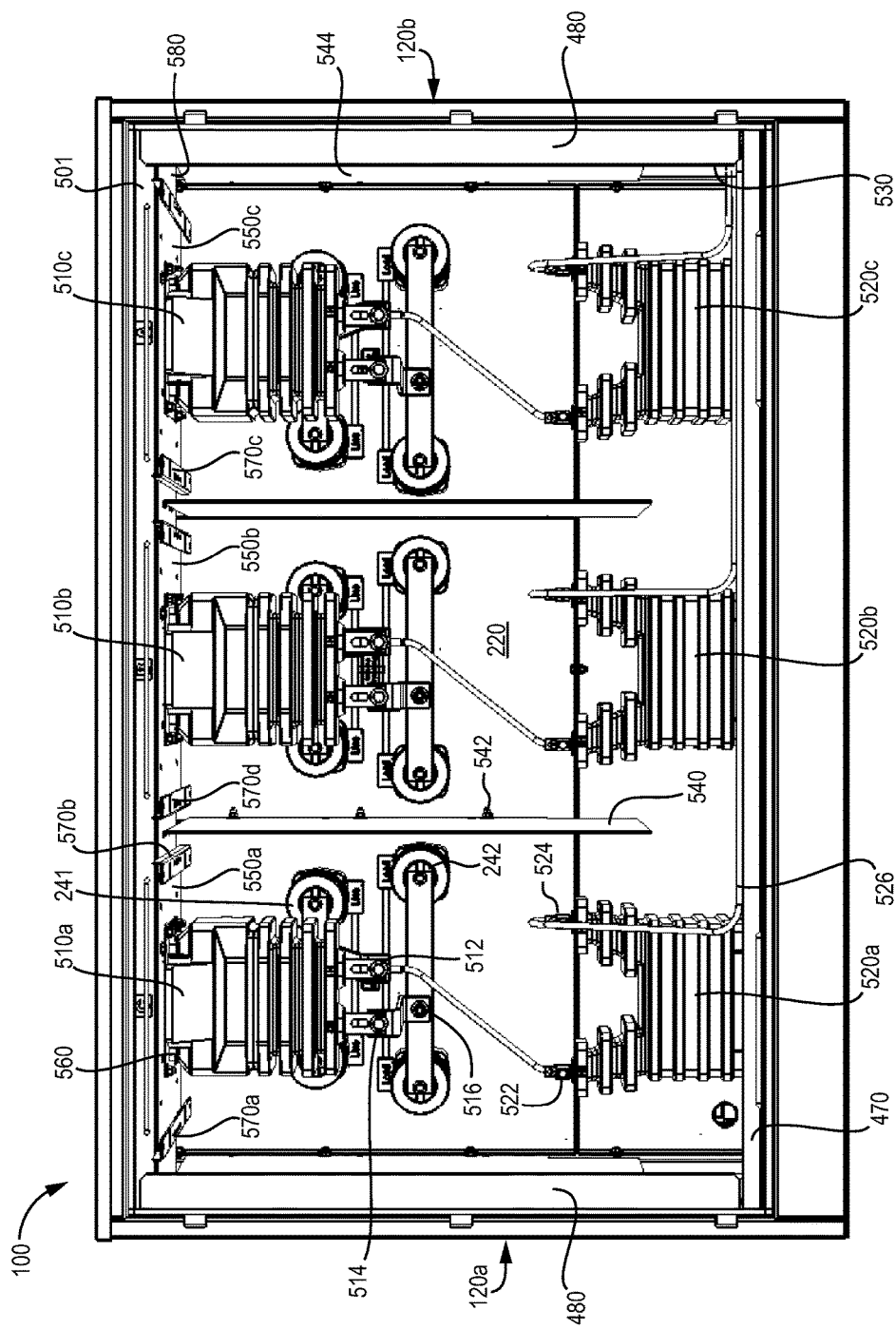
FIG. 5 is a rear planar view schematic drawing of the enclosure of FIG. 1 with barriers and doors removed, shown according to an exemplary embodiment.

Referring to FIG. 5, a rear elevation view of enclosure 100 is shown according to an exemplary embodiment. Door 452, door 454, and barriers 460 have been removed for the sake of clarity. Enclosure 100 may further include bottom barrier 470 and side barriers 480. Bottom barrier 470 and side barriers 480 may cooperate with barriers 460 to create a substantially continuous non-conductive separation between users and electrical equipment.

Enclosure 100 may include a frame. According to the embodiment shown, the frame includes a top portion 501. According to an exemplary embodiment, top portion 501 has a substantially "C"-shape, with the open portion of the "C" facing up. Top portion 501 is configured to at least partially support components and contents of enclosure 100. Top portion 501 may include a plurality of holes and slots configured to receive contents and components of enclosure 100.

According to one embodiment, enclosure 100 houses electrical equipment. According to another embodiment, enclosure 100 houses at least one transformer (e.g., instrument transformer, metering transformer, etc,). According to the embodiment shown, enclosure 100 houses a plurality of transformers. Enclosure 100 may receive any number of phases of electrical power. According to one embodiment, enclosure 100 may receive one phase of electrical power. According to the exemplary embodiment shown, enclosure 100 is configured to receive three phases of electrical power.

According to one embodiment, enclosure 100 includes at least one current transformer. According to the exemplary embodiment shown, enclosure 100 includes a first current transformer 510a, a second current transformer 510b, and a third current transformer 510c. The three transformers correspond to each of three phases of electrical power. According to alternate embodiments, current transformers 510 may all correspond to one phase of electrical power or may correspond in some combination to two phases of electrical power.

Current transformer 510 includes two terminals. First terminal 512 may connect to a line side power cable. First terminal 512 is shown electrically coupled to bushing 241, which passes through wall 220 to the front compartment. Second terminal 514 may connect to a load side power cable. Second terminal 514 is shown electrically coupled to bushing 242, which passes through wall 220 to the front compartment.

According to one embodiment, enclosure 100 includes at least one voltage (e.g., potential) transformer. According to the exemplary embodiment shown, enclosure 100 includes a first voltage transformer 520a, a second voltage transformer 520b, and a third voltage transformer 520c. Voltage transformer 520 includes two terminals. First terminal 522 is configured to receive power. First terminal 522 is shown electrically coupled to line side terminal 512 of current transformer 510. According to an alternate embodiment, first terminal 522 may be electrically coupled to load side terminal 514 of current transformer 510. According to various alternate embodiments, first terminal 522 may be electrically coupled to current transformer 510 indirectly, for example, coupling to nut 516. Second terminal 524 is shown connected to grounding point 530 via grounding cable 526. Grounding point 530 may be structurally similar to grounding point 230. Terminals 522 and/or 524 may be coupled to electrical instruments (e.g., power meters, power monitors, voltage meters, etc.). The electrical instruments may or may not be located remotely, such that a user may view the instrument without entering the rear compartment.

Current transformers 510 can be located in a top portion of enclosure 100 while voltage transformers 520 can be located in a bottom portion of enclosure 100. According to various alternate embodiments, some or all current transforms 510 could be in a bottom portion, and some or all voltage transformers 520 could be in a top portion. According to the embodiment shown, current transformers 510 are generally supported by top portion 501 of the frame.

Enclosure 100 may include one or more panels 540. Panels 540 are made of an electrically insulating material (e.g., plastic, fiberglass reinforced laminate, etc.) and are configured to isolate electrical equipment and fields between phases of transformers. Isolating equipment facilitates safe replacement of one transformer while other transformers remain energized. Panels 540 may be at least partially supported by top portion 501 of the frame. According to the exemplary embodiment, panels 540 include tabs 546 extending from a top end of panel 540 which engage slots in top portion 501 (see FIG. 7). Panels 540 may also be at least partially supported by wall 220. According to the embodiment shown, brackets 542 couple panels 540 to wall 220. According to one embodiment, panels 540 descend between adjacent transformers. According to another embodiment, panels 540 isolate adjacent phase pairs of current transformers 510 and voltage transformers 520. According to the embodiment shown, panels 540 are located between adjacent transformers 510 and are at least partially located between adjacent transformers 520. According to alternate embodiments, panels 540 may extend to bottom 310 or a bottom portion of the frame. Enclosure 100 may also include one or more panels 544, which are structurally similar to panels 542 but are located between the transformers and sidewalls 120.

Enclosure 100 includes at least one mounting plate 550. According to the embodiment shown, enclosure 100 includes a first mounting plate 550a, a second mounting plate 550b, and a third mounting plate 550c. Mounting plate 550 may be made of any suitably rigid material. According to one embodiment, mounting plate 550 is a non-painted metal (e.g., steel aluminum, etc.). As such, mounting plate 550 may act as a conductor and as part of a ground path. Mounting plate 550 may have a variety of shapes and sizes. According to the embodiment shown, mounting plate 550 is substantially rectangular and substantially flat. According to alternate embodiments, mounting plate 550 may be substantially non-rectangular and/or substantially non-flat. Mounting plate 550 may be round, octagonal, or of other polygonal shapes. According to another alternate embodiment, at least one edge of mounting plate 550 may be bent to form a flange. Mounting plate 550 may include flanges on all sides to form a skirt encompassing mounting plate 550. Mounting plate 550 may be folded to form one or more flanges (e.g., web, joist, spar, etc.) in a non-edge portion, of mounting plate 550. Alternatively, one or more flanges (e.g., web, joist, spar, etc.) may be coupled to mounting plate 550. A recess (e.g. depression, cavity, valley, etc.) may be formed in mounting plate 550. According to another alternate embodiment, mounting plate 550 may comprise a plurality of layers. According to various alternate embodiments, the plurality of layers may be adjacent, may form a laminate, may be offset by one or more substantially vertical webs, and/or may be offset by a corrugated layer.

Mounting plate 550 is configured to support electrical equipment. Each transformer 510 may be coupled to a mounting plate 550. According to the embodiment shown, transformer 510 is coupled to adapter 560, which is fastened to mounting plate 550. According to an alternate embodiment, a plurality of trans formers may be coupled to a mounting plate 550. According to another embodiment, mounting plate 550 is selected to have a similar galvanic potential as adapter 560. As such, galvanic corrosion is limited between plate 550 and adapter 560. According to the embodiment shown, mounting plate 550 and adapter 560 are both made of aluminum.

According to the embodiment shown, enclosure 100 includes at least one member, (e.g., bracket, etc.), shown as rail 570. According to the embodiment shown enclosure 100 includes a first rail 570a, a second rail 570b, and a third rail 570c, and a fourth rail 570d. Rails 570 may be made of any suitably rigid material, (e.g., steel, aluminum, etc.) and may be formed by any suitable process (stamping, bending, forging, extruding, etc.). According to an exemplary embodiment, rails 570 are formed from the same steel as the frame. Rails 570 may be coupled to a top portion 501 of the frame. According to the exemplary embodiment shown, rails 570 are welded to bottom surface 580 of top portion 501. According to alternate embodiments, rails 570 may be fastened to, or hang from, top portion 501.

Figure 6:
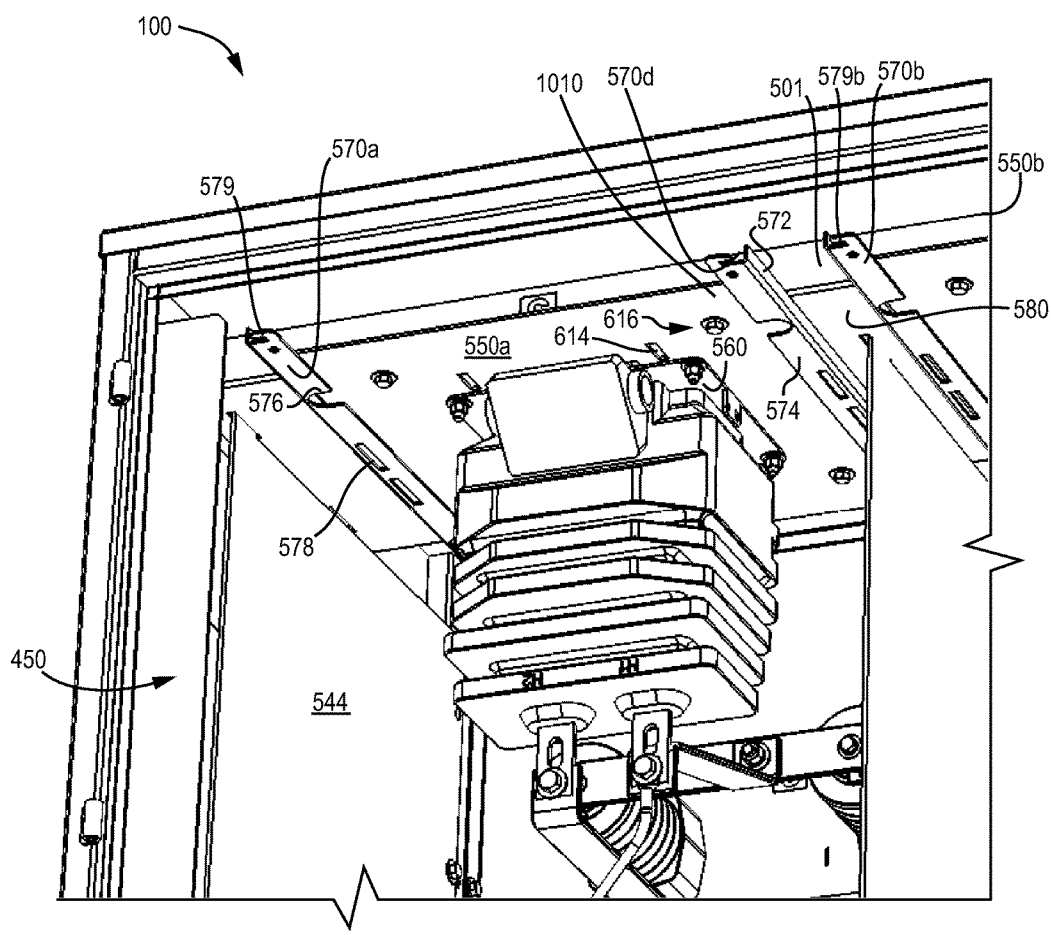
FIG. 6 is an enlarged perspective view schematic drawing of the enclosure of FIG. 1 with barriers and doors removed, shown according to an exemplary embodiment.
Figure 6A:
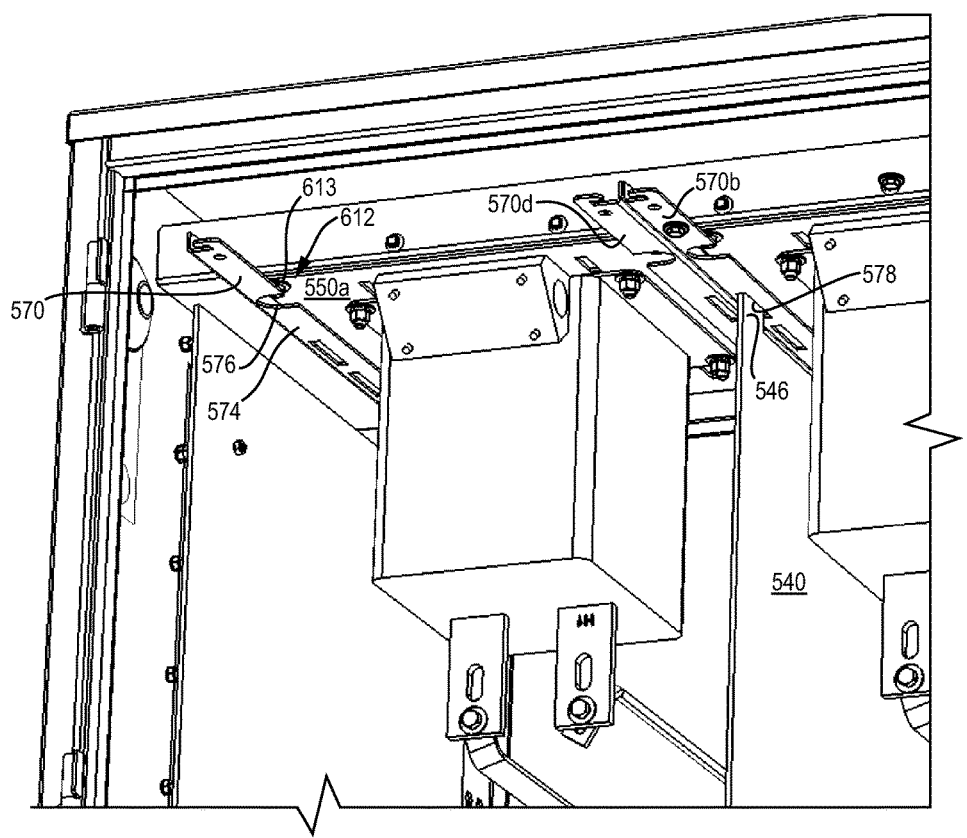
FIG. 6A is an enlarged perspective view schematic drawing of an enclosure with barriers and doors removed according to a first alternative embodiment.

Referring to FIG. 6, an enlarged rear view of enclosure 100 is shown according to an exemplary embodiment. Mounting plate 550 is shown to have at least one hole. The at least one hole may be configured to receive a fastener for coupling mounting plate 550 to the frame. The at least one hole may have a variety of shapes (round, rectangular, etc.). According to the embodiment shown, the at least one hole may be elongated and rectangular, such as slot 614, or an elongated circle, such as hole 616 (see FIG. 9). The at least one hole may be located in a central portion of mounting plate 550, as is slot 614, or located near an edge of mounting plate 550, as is hole 612 (see FIG. 6A, obscured by fastener 613). According to an alternative embodiment, the at least one hole may be a notch in an edge of mounting plate 550.

According to various embodiments, mounting plate 550 may include extra holes, which are configured for use in alternate embodiments. As such mounting plate 550 may be a universal mounting plate, usable in a variety of configurations and installations. Mounting plate 550 may be coupled to top portion 501 of the frame. Mounting plate 550 is shown fastened to a bottom surface 580 of top portion 501.

Rails 570 may have a first flange 572 and a second flange 574. First flange 572 may be substantially vertical, and second flange 574 may extend substantially horizontally from an edge portion of flange 572. Some rails 570 may be symmetric to other rails 570. For some rails 570, second flange 574 may extend to the right (e.g., rails 570a and 570b), and for some rails 570, second flange 574 may extend to the left (e.g., rail 570c). According to the embodiment shown, rail 570a and 570d are mirror images. As such, rails 570 are shown to be elongated "L"-shaped brackets, with the open portion of the "L" facing up and toward mounting plate 550.

Rails 550 may have a variety of alternate shapes and configurations. For example, according one alternate embodiment, rails 570 may be asymmetric. Rails 570 may be "C" shaped, with the open portion of the "C" facing toward mounting plate 550. Rails 570 may be "E" or "F" shaped with the open portion of the "E" or "F" facing toward the mounting plate. Rails 570 may include a third flange extending up or down from second flange 574. Rails 570 may be a "J" shape formed by a third flange extending up from second flange 574. "J" shape rails 570 may receive a downward extending flange from mounting plate 550. Rails 570 may be substantially round. According to another alternate embodiment, a rail 570 may be discontinuous, aligned segments. According to another alternate embodiment, rails 570 may be configured to promote sliding of mounting plate 550. For example, rails 570 may include bearings (e.g., ball bearings, roller bearings, etc.) configured to supported mounting plate 550. Alternatively, rails 550 may receive a low friction coating. According to the exemplary embodiment shown, rails 570b and 570d are spaced apart. According to the alternate embodiment shown in FIG. 6A, rails 570b and 570d may be adjacent each other. As such, rails 570b and 570d may be welded together or formed as one "I"-shaped piece.

Rails 570 may include one or more openings 576 (e.g., hole, notch, cutout, etc.). According to the embodiment shown, opening 576 is formed in an edge of flange 574. Alternatively, opening 576 may be a hole within flange 574. According to one embodiment, opening 576 can be located beneath a hole in the frame. According to an exemplary embodiment, opening 576 can be located beneath a hole in top portion 501 of the frame. According to the alternate embodiment shown in FIG. 6A, opening 576 can be located substantially beneath hole 612 (obscured by fastener 613). Locating opening 576 beneath a hole in the frame facilitates tool access to a fastener. For example, opening 576 facilitates wrench, socket, or driver access to fastener 613. Rails 570 may include one or more slots 578, configured to receive tabs 546 extending from a top end of panel 540. As such, rails 570 may at least partially support panels 540.

Rails 570 may include an end 579 (e.g., end portion, etc.). According to the embodiment shown, first rail 570a includes a first end 579a, second rail 570b includes a second end 579b, third rail 570c includes a third end, and fourth rail 570d includes a fourth end 579d. According to one embodiment, ends 579 are proximate aperture 450. According to another embodiment, ends 579 are proximate rear doors 452 or 454. According to another embodiment, ends 579 are adjacent an inner surface of rear doors 452 or 454. According to another embodiment ends 579 are spaced apart from a plane defined by an exterior of the enclosure 100 surrounding the aperture 450. According to one embodiment, ends 579 are offset from the plane less than three inches. According to one embodiment, ends 579 are offset from the plane less than one inch. According to the embodiment shown, ends 579 are offset from the plane between one to two inches.

Ends 579 may be configured to at least partially support barriers 460. As shown in FIG. 4, barrier 460 may include a slot 410 (e.g., hole, aperture, etc.) configured to receive an end portion 579 of a rail 570. As such barrier 460 may be at least partially supported by rail 570. As shown, first barrier 460a is at least partially supported by an end portion 579a of rail 570a, and second barrier 460b is at least partially supported by an end portion 579b of rail 570b. According to one embodiment, end 579 includes a flange extending from the end of rail 570. According to the embodiment shown, end 579 includes a notched flange. The notched flange is configured to releasably retain barrier 460. End 579a and end 579d are shown to cooperatively support barrier 460a. According to the exemplary embodiment shown, end 579b at least partially supports barrier 460b, and end 579c at least partially supports barrier 460c.

Figure 7:
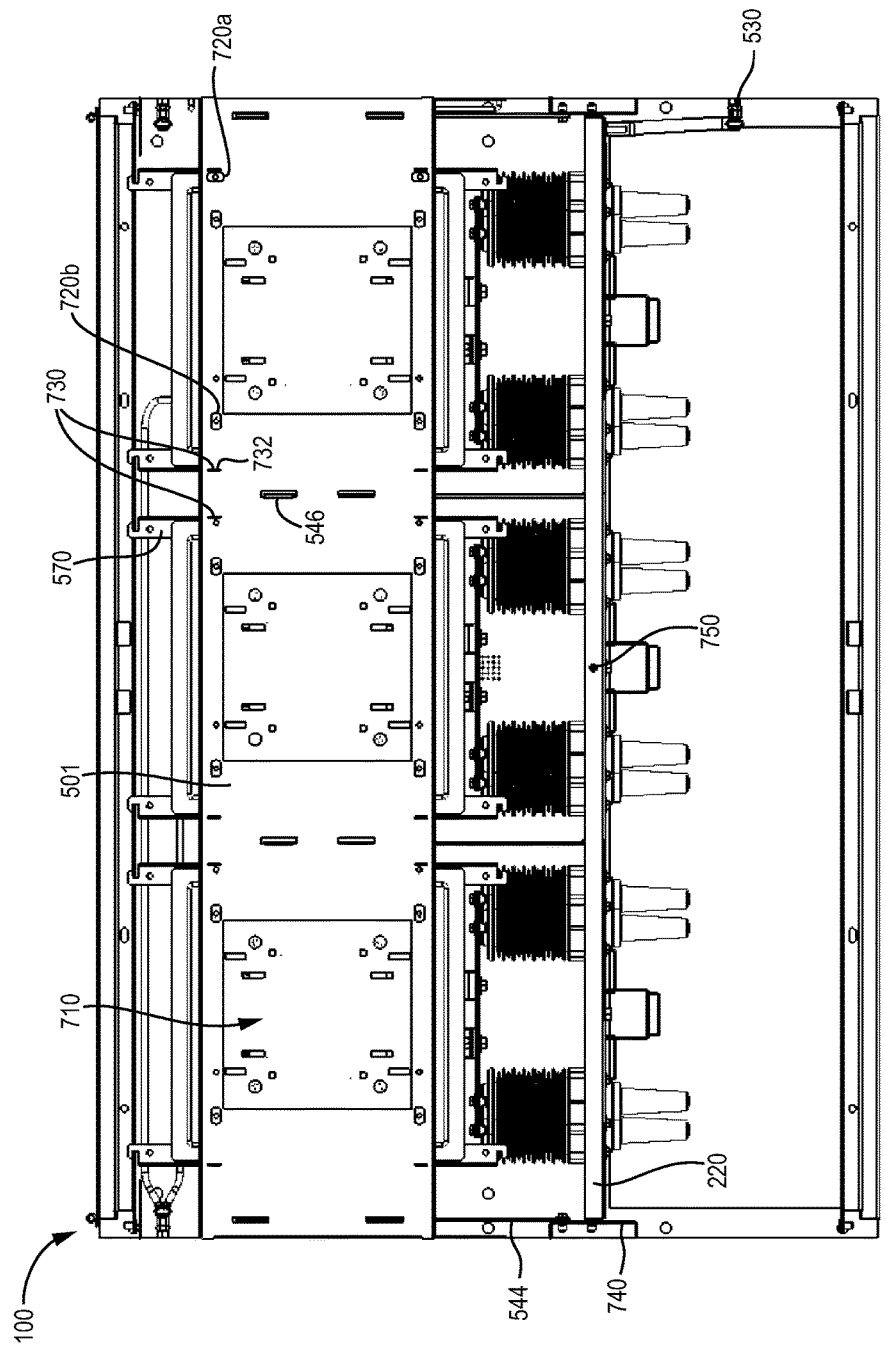
FIG. 7 is a top planar view schematic drawing of the enclosure of FIG. 1 with its exterior removed, shown according to an exemplary embodiment.

Referring to FIG. 7, a top view of enclosure 100 is shown according to an exemplary embodiment. The exterior of enclosure 100 has been removed for the sake of clarity. Top portion 501 of the frame may include at least one hole 710 (e.g., opening, aperture, cutout) configured to provide space for fasteners coupling adapter 560 to mounting plate 550. According to an alternate embodiment, a top portion 501 may instead include a depression (e.g., recess, etc.) configured to provide space for the fasteners. Top portion 501 may include one or more structures, shown as nut 720, coupled to the frame. According to an exemplary embodiment, nut 720 is welded to the frame. Nut 720 may be located above a hole in the frame. According to the exemplary embodiment shown, nut 720a is substantially concentric to hole 612, and nut 720b is substantially concentric to hole 616. According to various alternate embodiments, nut 720 may be located below top portion 501 of the frame, formed as threads in top portion 501, or formed to receive a non-threaded fastener (e.g., a rivet). Nut 720 may be electrically coupled to a grounding point. According to an exemplary embodiment, a ground strap electrically connects nut 720 and a grounding point. A ground path may then be created from the grounding point to nut 720. The ground path may further include fastener 613 and/or fastener 1010. The ground path may further include mounting plate 550. The ground path may further include adapter 620. The ground may include fasteners coupling adapter 550 to mounting plate 620. The ground path may further include transformer 510.

Top portion 501 may include one or more slots 730. Rail 570 may include tabs 732 extending from a top portion of rail 570. According to the exemplary embodiment shown, slots 730 are configured to receive tabs 732. As such, rails 570 may be located in top portion 501. According to one embodiment, rails 570 may be supported by tabs 732 received by slots 730. According to another embodiment, rails 570 may be support by tabs 732 prior to welding rail 570 to top portion 501.

Enclosure 100 may include one or more posts 740 (e.g., column, stanchion, etc.). Post 740 is shown to be substantially "C"-shaped with the open portion of the "C" facing out of enclosure 100. Post 740 may be welded to sidewalls 120 and/or bottom 310 to provide structural support for enclosure 100. As shown, post 740 is coupled to, and provides support for, dividing wall 220. Panels 544 may be at least partially supported by post 740. According to the exemplary embodiment shown, panel 544 is coupled to post 740. Dividing wall 220 may include mast 750 (e.g., bolt, etc.), configured to support roof 110.

Figure 8:
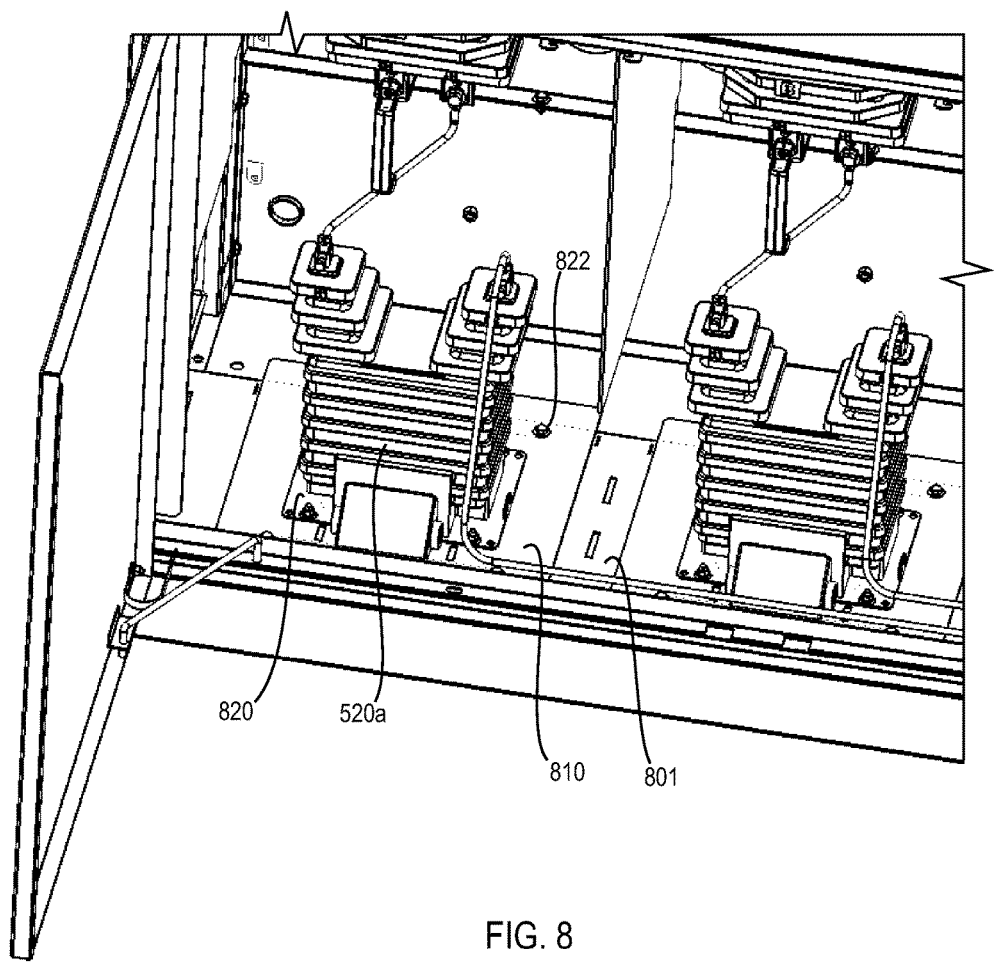
FIG. 8 is an enlarged rear view schematic drawing of the enclosure of FIG. 1, shown according to an exemplary embodiment.

Referring to FIG. 8, a downward rear view of enclosure 100 is shown according to an exemplary embodiment. Enclosure 100 may include a bottom portion 801 of the frame of enclosure 100. Bottom portion 801 may at least partially support electrical equipment within enclosure 100. Bottom portion 801 may be welded to sidewalls 120 and/or bottom 310. According to one embodiment, bottom portion 801 is different than top portion 501 of the frame. According to the exemplary embodiment shown, bottom portion 801 is the same (e.g., a copy, substantially identical to) as top portion 501 of the frame; however, bottom portion 801 is installed such that the open portion of the "C" shape is facing down.

Enclosure 100 may include a mounting plate 810. Mounting plate 810 may or may not be the same as mounting plate 550. According to the exemplary embodiment shown, mounting plate 810 is substantially identical to mounting plate 550. According to one embodiment, voltage transformer 520 may be coupled to mounting plate 810. According to the embodiment shown, transformer 520 is coupled to adapter 820, and adapter 820 is coupled to mounting plate 810. Mounting plate 810 may be fastened to bottom portion 801 of the frame using the same or different holes used to fasten mounting plate 550 to top portion 501 of the frame. According to the embodiment shown, mounting plate 810 is fastened to bottom portion 501 of the frame using the same holes used to fasten mounting plate 550 to top portion 501 of the frame. Fastener 822 is shown to use a hole that corresponds to hole 616 in mounting plate 550 (see FIG. 6).

Figure 9:
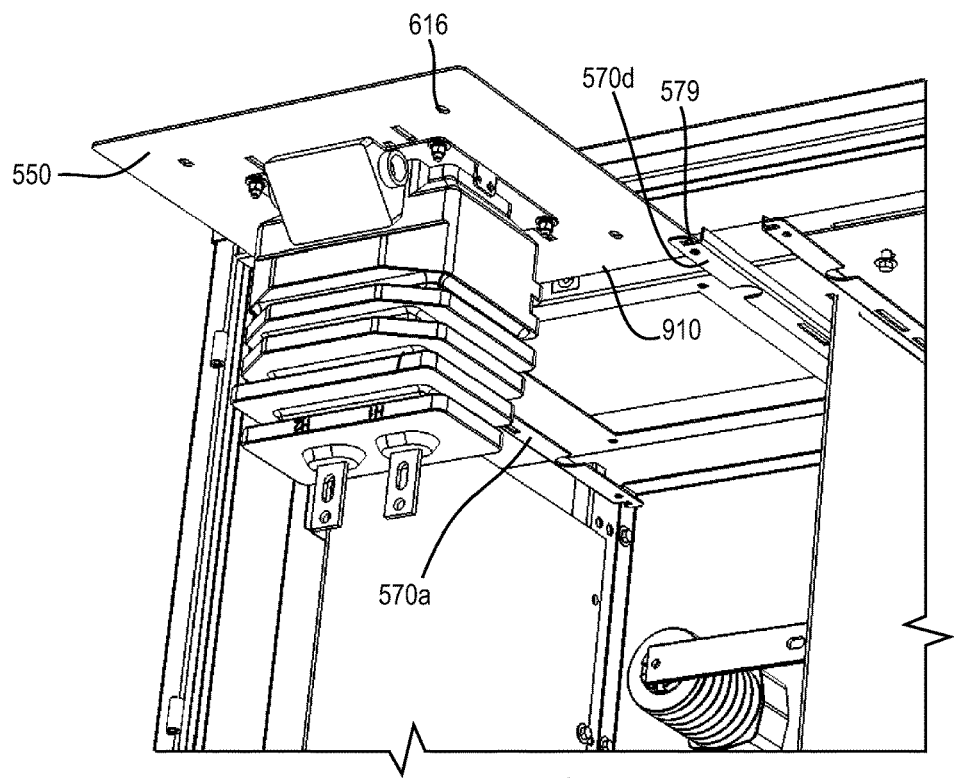
FIG. 9 is an enlarged perspective view schematic drawing of the enclosure of FIG. 1, shown according to an exemplary embodiment.

Referring to FIG. 9, an enlarged rear view of enclosure 100 is shown according to an exemplary embodiment. Electrical equipment is in the process of being installed into enclosure 100. According to the exemplary embodiment shown, transformer 510 has been coupled to mounting plate 550. Mounting plate 550 may be placed on rail 570. According to one embodiment, rails 570a and 570d cooperatively support at least a portion of mounting plate 550. A rear edge 910 of mounting plate 550 may be placed on rail 570. According to the exemplary embodiment shown, rail 570a and rail 570d may cooperatively support a rear edge 910 of mounting plate 550. Rail ends 579 may at least partially support mounting plate 550. According to one embodiment, rails 570 at least partially support mounting plate 550 while mounting plate 550 is mostly outside of enclosure 100. According to another embodiment, ends 579 are proximate a plane defined by an exterior of the enclosure 100 surrounding the aperture 450. As such, rails 570 may at least partially support mounting plate 550 while mounting plate 550 is substantially outside of enclosure 100. According to one embodiment, mounting plate 550 may translate along rails 570. According to the embodiment shown, mounting plate 550 slides (e.g., pushed) along rails 750 toward a first position within enclosure 100. According to an alternate embodiment, mounting plate 550 may be placed into enclosure 100 and set onto rails 570.

Figure 10:
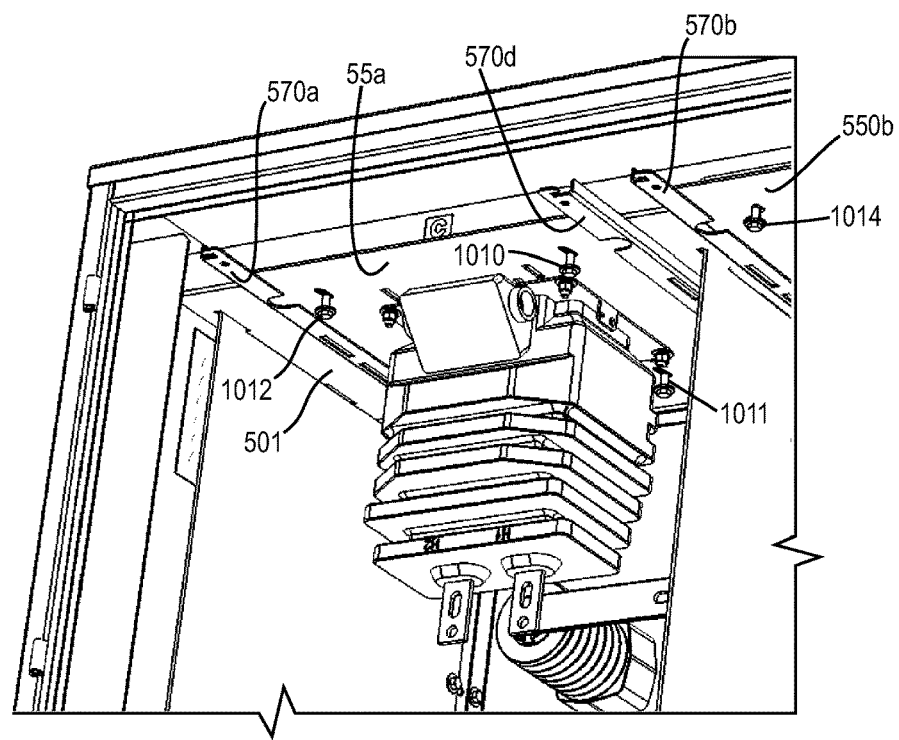
FIG. 10 is an enlarged perspective view schematic drawing of the enclosure of FIG. 1 with its barriers removed, shown according to an exemplary embodiment.

Referring to FIG. 10, an enlarged rear view of enclosure 100 is shown according to an exemplary embodiment. Mounting plate 550 is shown in a first position. According to the exemplary embodiment shown, mounting plate 550 is completely within enclosure 100 when in the first position. In the first position, mounting plate 550 may be at least partially supported by rails 570. According to the embodiment shown, in the first position, mounting plate 550 is cooperatively supported by rails 570a and 570d. According to one embodiment, when mounting plate 550 is in the first position, a hole in mounting plate 550 is beneath a hole in top portion 501 of the frame. One or more fasteners may be inserted through mounting plate 550 into one or more holes in the frame. According to the embodiment shown, fastener 1010 is inserted through hole 616 into the frame. According to an exemplary embodiment, fastener 1010 engages nut 720. Fasteners 1011 and 1012 may also be inserted through mounting plate 550 info the frame.

According to one embodiment, driving fastener 1010 into the frame moves the fastener from one position (e.g., third position, loosened position, etc.) toward another position (e.g., fourth position, tightened position, etc). According to another embodiment, moving fastener 1010 from a third position toward a fourth position moves mounting plate 550a from the first position toward a second position. Moving mounting plate 550 from the first position toward a second position may occur completely within enclosure 100. According to another embodiment, driving fastener 1010 into the frame raises mounting plate 550a from a position supported by rails 570 to a position offset from rails 570. According to an exemplary embodiment, moving fastener 1010 into the frame will raise at least a portion of mounting plate 550a toward a top portion 501 of the frame. According to the exemplary embodiment shown, driving fastener 1010 toward the frame will raise mounting plate 550 toward an installed position (see FIGS. 5 and 6).

Multiple fasteners may be driven sequentially and repeatedly to raise mounting plate 550. According to one embodiment, a first fastener may be partially tightened, then a second fastener may be partially tightened, then the first fastener may be tightened further, then the second fastener may be tightened further. According to another embodiment, additional fasteners may be partially tightened in sequence. According to the exemplary embodiment shown, at least fasteners 1010, 1011, and 1012 are tightened sequentially and repeatedly such that mounting plate 550 is raised in a substantially level orientation. Raising mounting plate 550 in a substantially level orientation may maintain substantially proportional stress on each fastener and/or may maintain substantially equal stress on each fastener. According to an alternate embodiment, a first fastener maybe completely driven into the frame; then a second fastener may be driven into the frame. According to various alternate embodiments, multiple fasteners may be driven in random, pseudo-random, or non-sequential order.

According to an exemplary embodiment, installation of second mounting plate 550b occurs similarly to installation of first mounting plate 550a. For example, mounting plate 550b may be at least partially supported by rail 570b. Fastener 1014 may be inserted through mounting plate 550b into the frame. Moving fastener 1014 toward the frame moves mounting plate 550b to a position offset from rail 570b. Completely tightening the fasteners may couple mounting plate 550 to top portion 501 of the frame. As such, mounting plate 550 is retained in a position offset from rails 570.

One of skill in the art will understand from this disclosure that to remove electrical equipment from enclosure 100, the installation steps described above are performed in substantially reverse order for their respective embodiments. According to one embodiment, each fastener is completely removed from the frame. According to another embodiment, each fastener is partially and repeatedly loosened from the frame. According to the exemplary embodiment shown, at least fasteners 1010, 1011, and 1012 are sequentially and repeatedly partially loosened from top portion 501 of the frame. During removal of the fasteners, mounting plate 550 may move from a second position to a first position. According to the exemplary embodiment, removal of at least fasteners 1010, 1011, and 1012 allows mounting plate 550 to move from a position offset from rail 570a to a position at least partially supported by rail 570a. When mounting plate 550 has been decoupled from the frame, mounting plate 550 may be removed from enclosure 100. According to an exemplary embodiment, mounting plate 550 may be removed from enclosure 100 when all of the fasteners securing mounting plate 550 to top portion 501 of the frame have been removed from the frame. Removing mounting plate 550 from enclosure 100 may include translating mounting plate 550 along rail 570, sliding mounting plate 550 along rail 570, and/or removing mounting plate 550 from rail 570.

Figure 11:
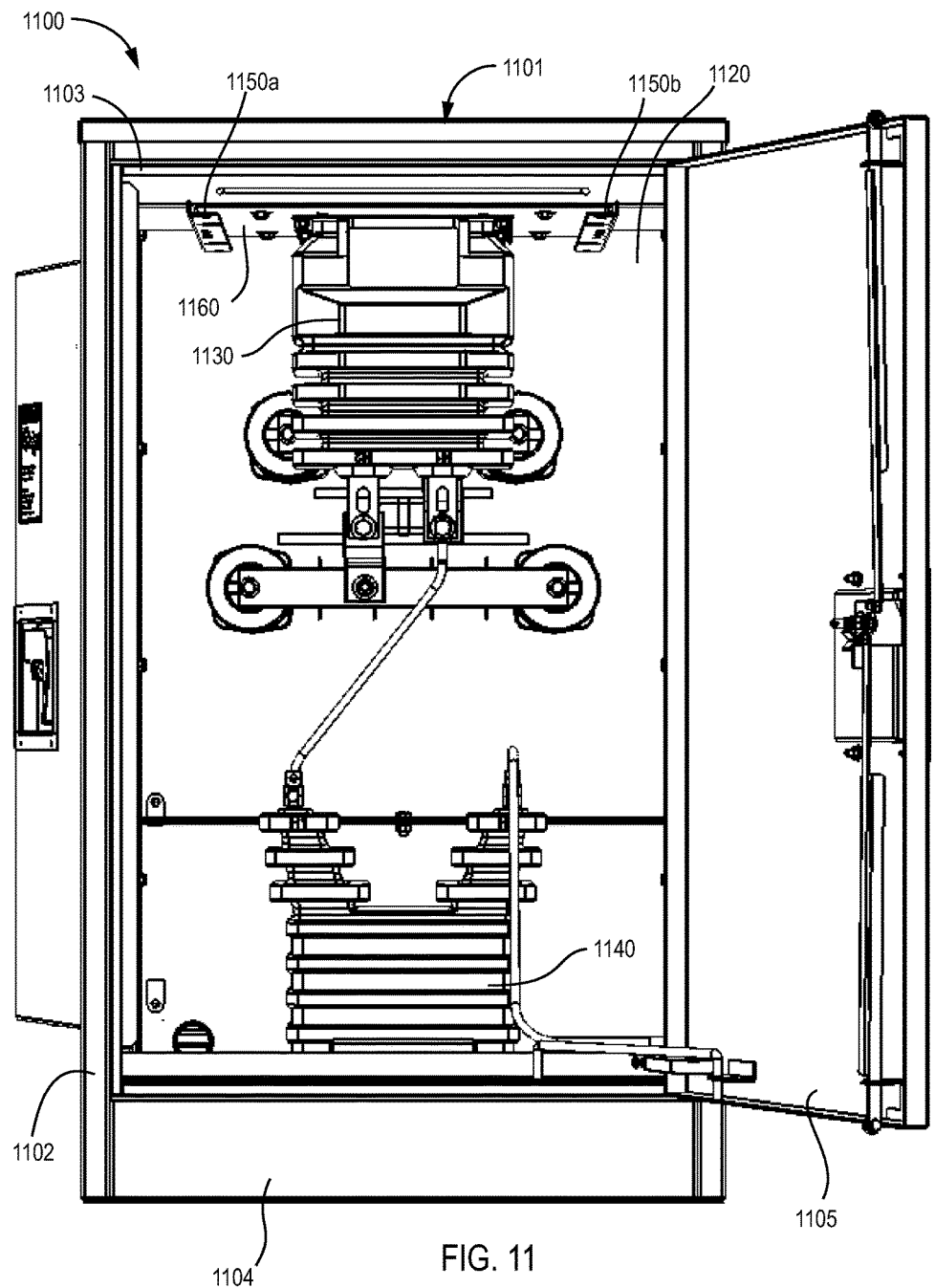
FIG. 11 is a planar rear view schematic drawing of an enclosure with its doors open, shown according to a second alternative embodiment.

Referring to FIG. 11, a rear elevation of enclosure 1100 is shown according to an alternative embodiment. Enclosure 1100 may or may not be structurally similar to enclosure 100. According to the embodiment shown, roof 1101, sidewalls 1102, upper beam 1103, lower beam 1104, and door 1105 are structurally similar to corresponding components of enclosure 100. Enclosure 1100 may have any number of compartments. Enclosure 1100 may include a dividing wall 1120, separating the rear (e.g., metering, live, etc.) compartment (shown) from a front (e.g., elbow, dead, etc.) comportment (not shown). Enclosure 1100 may be a single phase enclosure. Enclosure 1100 may include a single current transformer 1130 and a single voltage transformer 1140. A barrier similar to barrier 460 has been removed for the sake of clarify. Rails 1150a and 1150b are coupled to a frame of enclosure 1100. Transformer 1130 is shown coupled to mounting plate 1160. Mounting plate 1160 maybe be supported in a first position by rails 1150 during installation, and then moved to a second position offset from rail 1150, for example, the installed position shown.

According to another embodiment, a method for installing a transformer into an enclosure for electrical equipment may include providing an enclosure tor electrical equipment, the enclosure having a frame, coupling a first member to the frame, coupling a transformer to a first plate, placing the first plate into the enclosure such that it is at least partially supported by the first member, and fastening the first plate to the frame. According to another embodiment, the method may further include coupling a second member to the frame, and at least the first member and the second member cooperatively support the first plate when it is placed into the enclosure. According to one embodiment, fastening the first plate to the frame lifts the first plate from the first member. According to another embodiment, fastening the first plate to the frame includes driving a fastener through the first plate toward the frame. According to another embodiment, coupling a transformer to a first plate includes coupling the transformer to an adapter and coupling the adapter to the first plate.

Referring generally to the figures, according to one embodiment, a method for assembling an enclosure for electrical equipment may include providing an enclosure for electrical equipment, the enclosure having a frame, and coupling a first member to the frame. The first member may be configured to at least partially support a first plate in a first position, the first plate coupled to a transformer. The first plate may be configured to couple to the frame in a position offset from the first member.

It is also important to note that the construction and arrangement of the elements of the enclosure as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject, description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present inventions. Other substitutions, modifications, changes, and omissions may be made in the design, operating conditions, and arrangement of the preferred and other exemplary embodiments without departing from the spirit of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the spirit of the appended claims.

What is claimed is:

1. An enclosure for electrical equipment including a first transformer supported by a first plate, the enclosure comprising:
   a frame including a hole, the hole receiving a fastener;
   a first member;
   wherein the first member is coupled to the frame and slidably receives the first plate;
   wherein the first plate is at least partially supported by the first member when the first plate is in a first position;
   wherein the first plate does not contact the first member when the first plate is in a second position; and the first plate is moved to the second position by manipulating at least a portion of the fastener; and
   wherein the frame includes a structure, the structure coupled to the frame substantially concentric to the hole and providing at least part of a ground path from the first plate to the frame.

2. The enclosure of claim 1 further comprising a grounding point, the grounding point electrically coupled to the structure.

3. The enclosure of claim 1 further comprising;
   an aperture; and
   a plane, the plane defined by an exterior of the enclosure surrounding the aperture;
   wherein the first member comprises a first end; and
   wherein the first end is spaced apart from the plane.

4. The enclosure of claim 1 further comprising a first barrier;
   wherein the first member comprises a first end, the first end at least partially supporting the first barrier.

5. The enclosure of claim 4 further comprising:
   an aperture; and
   a plane, the plane defined by an exterior of the enclosure surrounding the aperture;
   wherein the first barrier is spaced apart from the plane.

6. The enclosure of claim 5 further comprising:
   a second plate; the second plate movable between a third position and a fourth position;
   a second transformer, the second transformer coupled to the second plate; and
   a second member; the second member coupled to the frame and receiving the second plate;
   wherein the second plate is at least partially supported by the second member when the second plate is in the third position; and
   wherein the second plate is coupled to the frame and offset from the second member when the second plate is in the fourth position.

7. The enclosure of claim 6 further comprising a second barrier;
   wherein the second member includes a second end, the second end at least partially supporting the second barrier.

8. A method for installing a transformer:
   providing an enclosure for electrical equipment, the enclosure including a frame;
   coupling a first member to the frame;
   coupling the transformer to a first plate;
   placing the first plate into the enclosure such that it is at least partially supported by the first member; and
   fastening the first plate to the frame by manipulating a fastener that is coupled to the first plate and received through a hole in the frame, wherein fastening the first plate to the frame lifts the first plate from the first member.

9. The method of claim 8 further comprising coupling a second member to the frame;
   wherein at least the first member and the second member cooperatively support the first plate when it is placed into the enclosure.

10. The method of claim 8, wherein fastening the first plate to the frame comprises driving a fastener through the first plate toward the frame.

11. The method of claim 8, wherein coupling a transformer to a first plate comprises:
    coupling the transformer to an adapter; and
    coupling the adapter to the first plate.

* * * * *